United States Patent Office 2,730,483
Patented Jan. 10, 1956

2,730,483

THERAPEUTIC COMPOSITIONS COMPRISING NEOMYCIN, GRAMICIDIN AND QUATERNARY AMMONIUM SALT OF THONZYLAMINE

George W. Mast, South Salem, and Theodore I. Fand, White Plains, N. Y., assignors to Nepera Chemical Co., Inc., Yonkers, N. Y., a corporation of New York No Drawing. Application August 12, 1952, Serial No. 304,013

10 Claims. (Cl. 167—65)

This invention relates to antibiotic compositions and relates more particularly to antibiotic compositions useful in the treatment of cuts, abrasions, wounds and other injuries liable to infection, as well as for the treatment of infectious conditions of body cavities, such as sinusitis, non-specific vaginitis, and the like.

An object of this invention is the provision of antibiotic compositions which are valuable for the treatment of infectious conditions.

Other objects of this invention will appear from the following detailed description.

The discovery of the extraordinary effectiveness of the antibiotic penicillin produced by the mold *Penicillium notatum* has been the starting point of a world-wide search for organisms capable of producing other useful antibiotic agents. That some measurable success has been achieved is witnessed by the discovery and acceptance of such newer antibiotics as streptomycin, aureomycin, chloromycetin and terramycin, among others. These compounds have taken an important place in the clinical picture and are widely employed in the treatment of many bacterial infections. The search for and development of the newer antibiotics has not taken the emphasis away from the development of newer and more effective ways of utilizing the older antibiotics. Continued research has been conducted for the better utilization of the known antibiotics and valuable and wholly unexpected advances have been made.

We have now found that when the antibiotic neomycin is employed in therapeutic compositions, in conjunction with the antibiotic gramicidin, an extraordinary degree of potentiation is observed and relatively minute concentrations of each drug, when employed together, are found to be far more effective than greatly increased concentrations of these drugs employed separately. The neomycin is preferably employed as a salt, such as the sulfate. This potentiation is found to be strikingly apparent in the case of the *Staph. aureus* organism.

Thus, for example, a concentration of neomycin sulfate of 0.062 milligram per 100 cubic centimeters, which concentration is also expressed by the term "mg. percent," and a concentration of 0.007 milligram per 100 cc. (i. e. 0.007 mg. percent) of gramicidin will each cause bacteriostasis in cultures of *Staph. aureus* when employed individually. When neomycin sulfate and gramicidin are employed in conjunction with each other, it has been found that bacteriostasis of *Staph. aureus* is obtained if these drugs are each present in concentrations of only 0.00125 mg. percent. Thus, when neomycin sulfate is employed with gramicidin, the neomycin sulfate is effective in but one-fiftieth of the concentration which is necessary for bacteriostasis when it is employed alone. Furthermore, when employed with neomycin sulfate, gramicidin is effective in but one-fifth the minimum effective concentrations which is necessary to cause bacteriostasis of *Staph. aureus* cultures when the gramicidin is used alone.

Our discovery may be utilized effectively in many ways. Thus, for example, useful therapeutic preparations may be obtained by dispersing gramicidin and neomycin sulfate in a suitable liquid vehicle, such as water, glycerin, propylene glycol or any mixture of these vehicles, and employing the resulting solution where antibacterial action is desired. A highly effective preparation may be obtained, for example, by dispersing the gramicidin and neomycin sulfate in water with the aid of a long-chain quaternary salt of thonzylamine, i. e., N-(2-pyrimidyl)-N-(p-methoxy-benzyl)-N', N'-dimethyl-ethylene diamine, as the dispersing agent. The quaternary salts of thonzylamine may be formed by reacting thonzylamine with an alkyl halide. Suitable alkyl halides are those wherein the alkyl group has up to about twenty carbon atoms, as more particularly described in co-pending application Ser. No. 276,671, filed March 14, 1952, now abandoned, a continuation-in-part of which is application Ser. No. 435,617, filed on June 9, 1954. Of these quaternary compounds, the cetyl bromide and lauryl bromide quaternaries are especially valuable as dispersing agents.

The combination of said quaternary salts of thonzylamine with either neomycin sulfate or gramicidin, or with both, also yields some striking examples of potentiation. While the mechanism of this potentiation is not clearly understood, the results produced when said quaternary salts of thonzylamine are employed with neomycin sulfate, or with gramicidin, or with both neomycin sulfate and gramicidin together, illustrate very clearly the high degree of potentiation achieved. Thus, for example, in the case of neomycin sulfate, as brought out above, bacteriostasis of *Staph. aureus* is observed when neomycin sulfate is employed in an amount of 0.062 mg. percent. However, when 0.078 mg. percent of the lauryl bromide quaternary salt of thonzylamine is employed together with neomycin sulfate, bacteriostasis of *Staph. aureus* is observed with the neomycin sulfate being present in an amount of only 0.0018 mg. percent, a reduction in concentration to only one thirty-fourth of that previously necessary.

Analogous results are observed when the cetyl bromide quaternary of thonzylamine is employed in conjunction with neomycin sulfate. In the latter case, bacteriostasis of *Staph. aureus* cultures are observed with a concentration of neomycin sulfate of only 0.0025 mg. percent when 0.025 mg. percent of the cetyl bromide quaternary is present, a reduction in the amount of neomycin sulfate necessary for bacteriostasis to almost one twenty-fifth of that required when it is employed alone. Similarly, with gramicidin and either the cetyl bromide or lauryl bromide quaternary salts of thonzylamine, a high degree of potentiation is observed. Bacteriostasis of *Staph. aureus* is produced employing but 0.0195 mg. percent of the lauryl bromide quaternary salt of thonzylamine together with 0.0004 mg. percent gramicidin, a seventeen fold reduction in the amount of gramicidin necessary for bacteriostasis. With the cetyl bromide quaternary of thonzylamine, bacteriostasis of *Staph. aureus* is obtained with a concentration of 0.025 mg. percent of said lauryl bromide quaternary and 0.0025 mg. percent of gramicidin, which is but about one-third of the concentration required for bacteriostasis when gramicidin is employed alone. The same potentiation effect is observed when the thonzylamine quaternary salts are employed in combination with both neomycin sulfate and gramicidin.

The antibacterial action and the potentiation achieved with preparations containing neomycin sulfate and gramicidin dispersed in a suitable medium, such as water, with the aid of a quaternary salt of thonzylamine of the structure described, may be utilized, for example, when said components are formulated into a nasal spray preparation in conjunction with certain other agents. Such a preparation may contain a vasoconstrictor of known action, such as phenylephrine or desoxyephedrine, and also a therapeutic compound of known antihistaminic action, such as thonzylamine hydrochloride. A pharmacologically inert preservative such as the methyl and/or propyl esters of p-hydroxy benzoic acid (methyl paraben and/or propyl paraben) and suitable buffering agents to maintain the desired pH are preferably included in such formulation.

As examples of such novel preparations of our invention, the following may be given, the proportions stated being given in percent by weight.

Example I

| | Percent by weight |
|---|---|
| Thonzylamine·HCl | 0.5 to 5 |
| Phenylephrine·HCl | 0.1 to 0.5 |
| Gramicidin | 0.001 to 0.01 |
| Neomycin sulfate | 0.1 to 0.5 |
| Cetyl bromide quaternary of thonzylamine | 0.025 to 0.1 |
| Preservative (mixture of methyl p-hydroxy benzoate and propyl p- hydroxy benzoate) | 0.01% (max.). |
| Phosphate buffer (e. g. Na₂HPO₄-NaH₂PO₄) | (To a pH of about 6.1.) |
| Water | Q. S. |

A preferred composition is the following:

| | Percent by weight |
|---|---|
| Thonzylamine·HCl | 1.0 |
| Phenylephrine·HCl | 0.25 |
| Gramicidin | 0.005 |
| Neomycin sulfate | 0.10 |
| Cetyl bromide quaternary of thonzylamine | 0.10 |
| Methyl and propyl paraben | 0.01 |
| Na₂HPO₄ | 0.3 |
| NaH₂PO₄ | 1.1 |
| Water | Q. S. |

Ointments may be prepared by rubbing or triturating the neomycin sulfate and/or gramicidin and thonzylamine quaternary compound into a hydrophobic ointment base such as lanolin, lard, petrolatum, or hydrogenated oil. If a water washable hydrophilic ointment is desired, the neomycin sulfate and/or gramicidin and thonzylamine quaternary compound may be rubbed or triturated into a base such as the carbowaxes or into a base such as U. S. P. hydrophilic ointment base. Advantageously, the composition of such a water-washable ointment may be as follows:

Example II

| | Percent by weight of ointment |
|---|---|
| Active ingredients: | |
| Neomycin sulfate | 0.1 to 0.5 |
| Gramicidin | 0.001 to 0.1 |
| Thonzylamine quaternary compound | 0.01 to 0.1 |
| Ointment base: | |
| Cetyl alcohol | percent 15 |
| White wax | do 1 |
| Sodium lauryl sulfate | do 2 |
| Propylene glycol | do 10 |
| Water | do 72 |

The potentiation activity may also be utilized where an adhesive or adherent vehicle of gel-like consistency is desired. Thus, pectin may be utilized to form a suitably adherent vehicle for the thonzylamine quaternary and the neomycin sulfate and/or gramicidin. Gum arabic, gum tragacanth, gum acacia methyl cellulose and sodium alginate are also suitable vehicles.

Thus, for example, formulations where a gel-like adherent composition is desired may be obtained by adding about 85 parts by weight of an aqueous solution containing 0.1 to 0.5% by weight of neomycin sulfate, 0.001 to 0.1% by weight of gramicidin and 0.01 to 0.10% by weight of thonzylamine quaternary compound to a mixture of 8 parts by weight of pectin and 18 parts by weight of glycerin and stirring well until a homogeneous paste is obtained.

Formulations of the above character are effective where it is desired to maintain the composition in contact with a specific area for an extended period of time.

In addition to solutions, salves and pastes, the novel composition of our invention may be utilized therapeutically in the form of suppositories which may have a base of cocoa butter or propylene glycol monostearate (monolene) or glycerinated gelatin, etc.

The novel composition of our invention may be employed as the active component of an ophthalmic solution as well as in the form of solutions for aural application. A suitable composition for aural application is the following.

Example III

| | Percent by weight of solution |
|---|---|
| Active ingredients: | |
| Thonzylamine·HCl | 1 |
| Neomycin sulfate | 0.1 |
| Gramicidin | 0.005 |
| Thonzylamine quaternary (cetyl or lauryl bromide) | 0.1 |
| Vehicle: | |
| Glycerine | 50 |
| Propylene glycol | 50 |

Where it may be desired that the medication remain in contact with the tissues of the mouth and throat over a prolonged period of time, this object may be attained by utilizing lozenges and troches. In such compositions, sugar and gum acacia form the base and the lozenges or troches may contain from 0.1 to 0.5% by weight of neomycin sulfate, 0.001 to 0.01% by weight of gramicidin and 0.01 to 0.1% by weight of the thonzylamine quaternary.

Ophthalmic solutions or salves may also be formulated. The solution described in Example I may also be employed as an irrigating fluid for the irrigation of wounds and cuts.

It is to be understood that the foregoing detailed description is given merely by way of illustration and that many variations may be made therein without departing from the spirit of our invention.

Having described our invention, what we desire to secure by Letters Patent is:

1. A therapeutic composition of matter comprising a neomycin salt, gramicidin and a quaternary ammonium salt of thonzylamine.

2. A therapeutic composition of matter comprising a neomycin salt, gramicidin, a quaternary ammonium salt of thonzylamine and a viscous supporting carrier.

3. A therapeutic composition of matter comprising a neomycin salt, gramicidin, a quaternary ammonium salt of thonzylamine and an aqueous carrier buffered to a pH equivalent to that of the nasal mucosa, said pH being about 6.1.

4. A therapeutic composition of matter comprising a neomycin salt, gramicidin, thonzylamine, a vasoconstrictor and a quaternary ammonium salt of thonzylamine and an aqueous carrier buffered to a pH equivalent to that of the nasal mucosa, said pH being about 6.1.

5. A therapeutic composition of matter comprising essentially the following:

| | Percent by weight |
|---|---|
| Neomycin sulfate | 0.1 to 0.5 |
| Gramicidin | 0.001 to 0.01 |
| Thonzylamine·HCl | 0.5 to 5.0 |
| Phenylephrine·HCl | 0.1 to 0.5 |
| Quaternary ammonium salt of thonzylamine | 0.025 to 0.1 | in an aqueous medium buffered with a phosphate buffer to a pH equivalent to that of the nasal mucosa, said pH being about 6.1.

6. The composition of claim 5 wherein the quaternary ammonium salt of thonzylamine is thonzylamine cetyl bromide.

7. The composition of claim 5 wherein the quaternary ammonium salt of thonzylamine is thonzylamine lauryl bromide.

8. A therapeutic composition of matter comprising:

| | Percent by weight |
|---|---|
| Neomycin sulfate | 0.1 to 0.5 |
| Gramicidin | 0.001 to 0.1 |
| Quaternary ammonium salt of thonzylamine | 0.01 to 0.1 | dispersed in an ointment base.

9. A therapeutic composition of matter comprising essentially the following:

| | Percent by weight |
|---|---|
| Thonzylamine·HCl | 0.5 to 5 |
| Neomycin sulfate | 0.1 to 0.5 |
| Gramicidin | 0.001 to 0.01 |
| Quaternary ammonium salt of thonzylamine | 0.025 to 0.1 | in a liquid vehicle comprising a mixture of glycerin and propylene glycol.

10. A therapeutic composition of matter comprising:

| | Percent by weight |
|---|---|
| Neomycin sulfate | 0.1 to 0.5 |
| Gramicidin | 0.001 to 0.01 |
| Quaternary ammonium salt of thonzylamine | 0.01 to 0.1 | in a carrier base of suppository form.

References Cited in the file of this patent

UNITED STATES PATENTS

| 2,472,640 | Wilcox | June 7, 1949 |
| 2,533,066 | Taplin | Dec. 5, 1950 |
| 2,544,630 | Hegarty | Mar. 6, 1951 |
| 2,584,166 | Stevenson | Feb. 5, 1952 |
| 2,611,731 | Rawlins | Sept. 23, 1952 |
| 2,643,967 | Pfannmuller | June 30, 1953 |

FOREIGN PATENTS

| 493,385 | Belgium | May 16, 1950 |
| 279,843 | Switzerland | Apr. 1, 1952 |

OTHER REFERENCES

Fisher: "Influence of Wetting Agents on Various Antiseptics," Am. J. Pub. Health, April 1942, pages 389–394.

Jawetz et al.: "Studies on Antibiotic Synergism and Antagonism," J. Bacteriology, July 1952, pages 29 to 39, especially Table 1, page 31.

Modern Drugs, October 1952, pages 228 and 230, "Spectrocin." (J. in Div. 43.)

"Clinical Evaluation of Neomycin in Different Bases," Forbes, South. Med. J. 45:235 (1952). Through Am. J. Pharmacy, July 1952, page 243.

Science-Supplement, May 9, 1941, pages 8 and 9, "A New Germ-Killing Chemical" (Gramicidin).

Trans. Amer. Acad. Ophth. and Laryng., Sulfonamides and Tyrothricin, August 1943, page 433.

Tyrothricin (Solution, Spray, Troches), Am. J. Pharmacy, April 1950, pages 141 and 142.